United States Patent [19]

Keesman et al.

[11] Patent Number: 5,691,770
[45] Date of Patent: Nov. 25, 1997

[54] DEVICE AND METHOD FOR CODING VIDEO PICTURES

[75] Inventors: Gerrit J. Keesman; Willem M. J. Coene; Eduard W. Salomons, all of Eindhoven, Netherlands

[73] Assignee: U.S. Philips Corporation, NY, N.Y.

[21] Appl. No.: 637,254

[22] Filed: Apr. 24, 1996

[30] Foreign Application Priority Data

Apr. 25, 1995 [EP] European Pat. Off. .............. 95201055

[51] Int. Cl.$^6$ .............................. H04N 7/32; H04N 7/30
[52] U.S. Cl. .............................. 348/405; 348/419
[58] Field of Search ...................... 348/405, 404, 348/403, 419, 390, 384, 406; H04N 7/30, 7/32

[56] References Cited

U.S. PATENT DOCUMENTS

| 5,526,131 | 6/1996 | Strolle et al. ............... 348/384 |
| 5,550,590 | 8/1996 | Sakazawa et al. .......... 348/387 |

OTHER PUBLICATIONS

Choi et al, "A Stable Feedback Control of the Buffer State Using the Controlled Legrane Multiplier Method", IEEE Trans. on Image Proc., vol. 3, No. 5, pp. 546–558, Sep. 1994.

Uz et al, "Optimal Bit Allocation in the Presence of Quantizer Feedback", IEEE, pp. V-385–V-388, Apr. 1993.
Schuster et al, "Fast and Efficient Mode and Quantizer Selection in the Rate Distortion Sense for H.263", Proc. of SPIE, vol. 2727, No. 2, pp. 784–795, Mar. 1996.
Zabele, G. Stephen, "Fourier of Closed Planar Boundaries", IEEE Trans. on Pattern Anal. Machine Intelligence, vol. PAMI–7, No. 1, pp. 98–102, Jan. 1985.
"Ramchandran et al, Rate–Distortion Optimal Fast Thresholding with Complete JPEG/MPEG Decoder Compatibility" IEEE Transactions on Image Processing, vol. 3, No. 5, Sep. 1994.
MPEG2 Test Model 5, Apr. 1993, p. 57.

*Primary Examiner*—Tommy P. Chin
*Assistant Examiner*—Vu Le
*Attorney, Agent, or Firm*—Laurie E. Gathman

[57] ABSTRACT

The picture quality of an MPEG-coded video signal can be improved considerably by modifying selected coefficients after conventional quantization, for example by rendering them zero. The modification is such that the Lagrangian cost $D+\lambda R$ (D is distortion, R is bitrate) is minimal for a given value of a Lagrange multiplier $\lambda$. A relatively simple process is disclosed in which the value of $\lambda$ is calculated by means of statistical analysis (6) of the picture to be coded. The statistical analysis comprises the estimation of the RD curve on the basis of the amplitude distribution of the coefficients. The searched $\lambda$ is the derivative of this curve at the desired bitrate.

20 Claims, 4 Drawing Sheets

DEVICE AND METHOD FOR CODING VIDEO PICTURES

FIELD OF THE INVENTION

The invention relates to a device for coding video pictures, comprising: a picture transformer for transforming blocks of pixels into coefficients; coding means for encoding said coefficients, the bit rate R and distortion D of the encoded picture being determined by a coding parameter; means (3) for selecting one from a series of coding parameter values for which the sum D+λR is minimal for an applied value of λ; and calculation means for calculating the value of λ. The invention also relates to a method of coding video pictures.

BACKGROUND OF THE INVENTION

A device as mentioned in the opening paragraph is disclosed in "Ramchandran and Vetterli: Rate-Distortion Optimal Fast Thresholding with complete JPEG/MPEG Decoder Compatibility", IEEE Transactions on Image Processing, Vol. 3, No. 5, September 1994. The article discloses a method of improving the picture quality of an MPEG encoder. As is generally known in the field of image coding, MPEG defines an encoder comprising a picture transformer to obtain coefficients, and a quantizer for imaging the coefficients to a proximate quantization level. The quantization level constitutes a coding parameter. In accordance with the prior art method, the picture quality is improved by tresholding the quantized coefficients, i.e. by selecting the quantization level zero rather than the conventional quantization level if that is better in a rate vs. distortion sense.

The prior art method will briefly be summarized with reference to FIG. 1. In this Figure, the reference numeral 100 denotes a rate-distortion curve (hereinafter abbreviated to RD curve) for a range of quantization step sizes $\alpha$. By thresholding, the bitrate will be lower because fewer non-zero coefficients are transmitted, and the distortion will be larger. In FIG. 1, curve 101 represents an RD curve if the thresholding operation is performed on coefficients which have been quantized with a step size $\alpha 1$. Curve 102 represents an RD curve if the thresholding operation is performed on coefficients which have been quantized with a larger step size $\alpha 2$. The curves 101 and 102 will hereinafter be referred to as thresholding curves. They are obtained by determining the minimum value of what is known as the "Lagrangian cost" for different values of the "Lagrange multiplier" λ. The Lagrangian cost is defined as:

$$L(b,\lambda)=D(b)+\lambda \cdot R(b)$$

In this expression, b represents a set of coefficient values to be encoded. D(b) and R(b) are the distortion and the bitrate, respectively, upon encoding of these coefficients. The Lagrange multiplier λ is a natural number which is larger than or equal to 0. For each λ, a tresholding operation can be found which yields a set b of coefficients for which $L(b,\lambda)$ is minimal. The distortion D(b) and bitrate R(b) applying to this set constitutes a point on the thresholding curve. The starting point ($\lambda=0$) is always on the curve 100. As λ increases, the distortion will be larger and the bitrate lower. As is apparent from FIG. 1, a given bitrate R1 can be achieved both by (i) quantizing the coefficients with step size $\alpha 2$ and transmitting all quantized coefficients, and by (ii) quantizing the coefficients with a smaller step size $\alpha 1$ and thresholding selected coefficients. Apparently, option (ii) is more favourable because it yields less distortion.

The curves 101 and 102 shown are only two curves of many possible thresholding curves. The envelope thereof, denoted by 103 in the Figure, constitutes the optimal RD curve for a given picture. It is completely below curve 100. In other words, at any desired bitrate, thresholding may result in a step size $\alpha$ and a Lagrange multiplier λ which yields a smaller distortion than when thresholding is not carried out. The way in which the optimal operating point of an encoder is determined is, however, very intensive from a computation point of view. It is an iterative procedure in which the optimal set of coefficients is searched for a large number of values of λ.

OBJECT AND SUMMARY OF THE INVENTION

It is an object of the invention to provide an encoder which determines the optimal operating point in a less cumbersome way.

According to the invention, the device is therefore characterized in that the calculation means comprise: means for measuring the amplitude distribution of coefficients; means for estimating the bit rate R and distortion D from said amplitude distribution for a plurality of coding parameter values to obtain an estimated RD curve; and means for computing $\lambda=-dD/dR$ at a selected point of said RD curve.

The invention is based on the recognition that the searched Lagrange multiplier λ for a desired bit rate is equal to the negative value of the derivative of the RD curve, and utilizes the fact that at least a good approximation of the RD curve can be derived from the distribution of coefficient amplitudes for each spatial frequency. Said amplitude distribution can easily be measured by statistic pre-analysis of the picture to be coded. For example, the amplitude distribution can be obtained by counting, for each spatial frequency, the number of times when a coefficient indicative of said spatial frequency assumes the same amplitude.

In one embodiment of the device in accordance with the invention, the means for estimating the bit rate R is adapted to cumulatively add, for all spatial frequencies, the product of the number of bits to encode a given amplitude with the number of occurrences when a coefficient assumes said amplitude as defined by the amplitude distribution. Alternatively, the means for estimating the bit rate R is adapted to calculate the entropy from said amplitude distribution, said entropy being indicative for the bit rate R.

These and other aspects of the invention will be apparent from and elucidated with reference to the embodiments described hereinafter.

DESCRIPTION OF EMBODIMENTS

Figure 1:
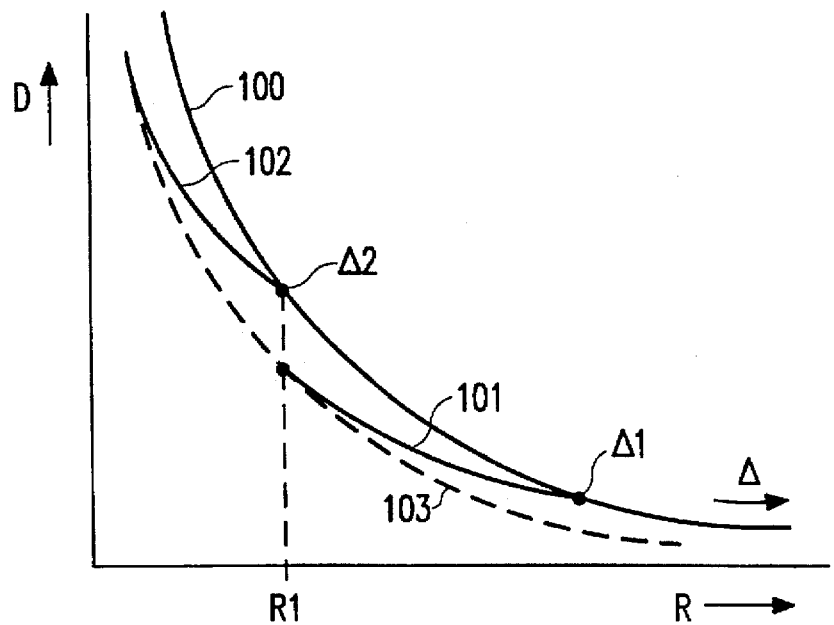
FIG. 1, already described, shows some rate-distortion curves to explain a prior-art device.
Figure 2:
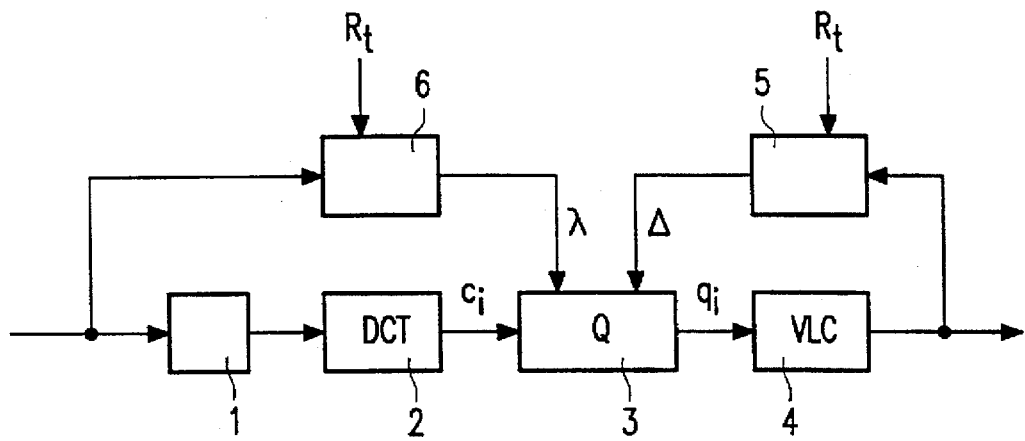
FIG. 2 shows a device for coding a video signal according to the invention.

FIG. 2 shows a device for coding a video signal according to the invention. The device comprises a delay 1, a picture transformer 2, a quantizer 3, a variable-length coding circuit 4, a bitrate control circuit 5 and a λ calculator 6. An important aspect of the invention is that the video signal can be encoded in accordance with the MPEG standard. To this end, the picture transformer 2, the variable-length coding circuit 4 and the bitrate control circuit 5 in this embodiment are identical to the corresponding elements of the generally known MPEG encoder. Therefore, they are not described in detail. For the sake of simplicity, FIG. 2 only shows the elements which are necessary for intraframe coding. The invention is also applicable to interframe coding. The applied picture is then first subtracted from a motion-compensated prediction picture, whereafter the residue thus obtained is coded.

In the picture transformer 2, the applied picture is block-sequentially subjected to a picture transform. In the embodiment, Discrete Cosine Transform (DCT) is used. Any suitable frequency transform may, however, be used, including sub-band filtering. The DCT transforms each picture block of, for example 8*8 pixels into a block of 8*8 coefficients $c_i$, in which i=0 . . . 63 indicates the order of increasing extent of picture detail.

The DCT coefficients $c_i$ are applied to the quantizer 3 which images each coefficient $c_i$ at a discrete quantization level. The quantization levels are spaced apart by a step size $\alpha_i$. For reasons of compatibility with the MPEG standard, the step size $\alpha_i$ is coefficient-dependent in conformity with weighting factors $W_i$ which are stored in a quantization matrix. The quantization step size is controlled per block by the bitrate control circuit 5 which applies a step size α to the quantizer. The step size $\alpha_i$ is calculated in accordance with the expression $$\alpha_i = c \cdot W_i \cdot \alpha$$

in which i denotes a spatial frequency, $W_i$ is the weighting factor for said spatial frequency, and c is a constant. The quantization matrix is generally different for intra coded (I) pictures and inter coded (P,B) pictures.

In a conventional MPEG encoder, the quantizer images each coefficient $c_i$ at one of the two nearest quantization levels. In accordance with the invention, quantizer 3 also receives a Lagrange multiplier λ. Dependent on λ, the quantizer now images a coefficient $c_i$ at a different than the nearest quantization level. More particularly, the quantizer forces a coefficient to assume a different level if that is more efficient in a rate-distortion sense. Embodiments of quantizer 3 and λ-calculator 6 will be described in greater detail.

The quantized coefficients $q_i$ are subsequently applied to a variable-length coding circuit 4. This circuit forms a variable-length codeword for each non-zero coefficient and a possibly preceding series of non-zero coefficients in conformity with the MPEG standard. The codewords formed are transmitted after buffering (not shown) via a transmission channel. The codewords are also applied to the bitrate control circuit 5. This circuit controls the step size α in further known manner in such a way that the number of bits per block is always as much as possible in conformity with a predetermined target $R_r$.

The Lagrange multiplier λ is applied to the quantizer by λ-calculator 6. This calculator calculates λ by analysis of the picture to be coded. To this end, the video signal is directly applied to the λ-calculator, while the actual coding of the signal (transform, quantization, variable-length coding) takes place after it has been delayed by one picture period via delay 1.

Figure 3:
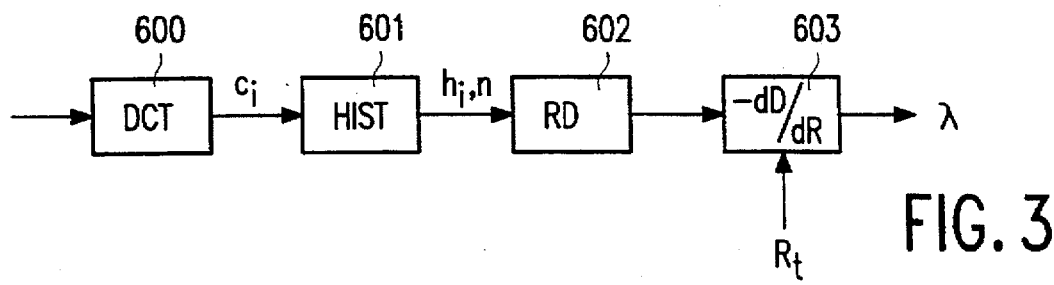
FIG. 3 shows the block diagram of a λ calculator shown in FIG. 2.

FIG. 3 shows a block diagram of λ-calculator 6. The calculator comprises a picture transformer 600, a histogram forming circuit 601, an RD estimating circuit 602 and a computing circuit 603. The picture transformer 600 is identical to picture transformer 2 in FIG. 2 and supplies 64 coefficients $c_i$ (i=0 . . . 63) for each block. The index i indicates the spatial frequency. The coefficients have an amplitude n in the range [−2047,2048]. The histogram forming circuit 601 forms, for each spatial frequency i, a histogram of the coefficient amplitude distribution. For example, the circuit 601 counts the number of times when coefficient $c_i$ assumes the value n and records the result in a two-dimensional array $h_{i,n}$. More sophisticated embodiments of histogram forming circuit 601 will be described later. Using the histograms $h_{i,n}$, the RD estimating circuit 602 generates an estimation for the RD curve. Finally, computing circuit 603 calculates the Lagrange multiplier λ from the estimated RD curve. In fact, the searched Lagrange multiplier λ is constituted by the derivative −dD/dR of the RD curve at a given target bit rate or a given distortion.

Figure 4:
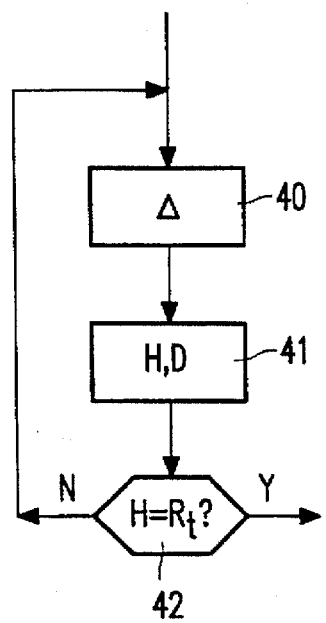
FIG. 4 shows a flow chart to explain the operation of a computing circuit shown in FIG. 3.

The operation of RD estimating circuit 602 will be explained with reference to a flow chart of operations shown in FIG. 4. In a step 40, a value is assigned to a quantization step size α. Subsequently, the bit rate R and distortion D for this step size are computed in a step 41. Embodiments of this step 41 will be described below in greater detail. If the step 41 were performed for a large number of step sizes α, then it would yield an RD curve denoted by 500 in FIG. 5. However, it is not necessary to have the RD curve completely available. Because the Lagrange multiplier λ is the derivative −dD/dR at point P (see FIG. 5) corresponding with a target bit rate $R_r$, only the part of the RD curve around the point P is to be found. Known numerical algorithms can be used to determine point P, for example a "bi-section algorithm". This is denoted in FIG. 4 by means of a step 42 in which it is checked whether the bit rate R at the current step size α is sufficiently equal to the target number of bits $R_r$. As long as this is not the case, a different step size α is selected (step 40) and the computing step 41 is performed with the different step size. It is recalled that (the relevant part of) the RD curve can be computed from the available histogram $h_{i,n}$. It is not necessary to transform the picture again for each computation of R and D.

An example of computing the distortion D and two examples of computing the bit rate R (step 41 in FIG. 4) will now be described. As already mentioned previously, the step size α is indicative of the spacing $\alpha_i$ between discrete quantization levels. The RD estimating circuit 602 determines from $h_{i,n}$ how often the amplitude n of coefficient $c_i$ corresponds to a quantization level $r_k$, i.e. how often the amplitude n is within an interval $[t_k, t_{k+1}]$. The number of occurrences of $C_i$ with an amplitude $t_k \leq n < t_{k+1}$ is:

$$\sum_{n=t_k}^{t_{k+1}} h_{i,n}$$

It often holds that $t_k = r_k - \frac{1}{2}\alpha_i$ and $t_{k+1} = r_k + \frac{1}{2}\alpha_i$ but this is not necessary. It is further to be noted that $\alpha_i$ may be different for I-pictures and P- or B-pictures.

Each occurrence introduces a distortion. A measure for said distortion is $(r_k - n)^2$. Thus, the distortion of all N coefficients $c_i$ corresponding with a particular spatial frequency i is:

$$d_i = \frac{1}{N} \sum_k \sum_{n=t_k}^{t_{k+1}} h_{i,n} \cdot (r_k - n)^2$$

The distortion for the current picture then is:

$$D = \sum_{i=0}^{63} d_i$$

In a first embodiment of computing the bit rate R, said bit rate is assumed to be equivalent with the entropy H of the picture. The entropy H is calculated in the following manner. The probability $p_k$ of coefficient $c_i$ assuming the quantization level $r_k$ is calculated from the histogram $h_{i,n}$ as:

$$p_k = \frac{1}{N} \sum_{n=t_k}^{t_{k+1}} h_{i,n}$$

Subsequently the entropy $H_i$ of coefficient $c_i$ and the entropy H of the picture are calculated as:

$$H_i = \sum_k p_k \cdot \log(p_k) \text{ and } H = \sum_{i=0}^{63} h_i, \text{ respectively.}$$

Figure 5:
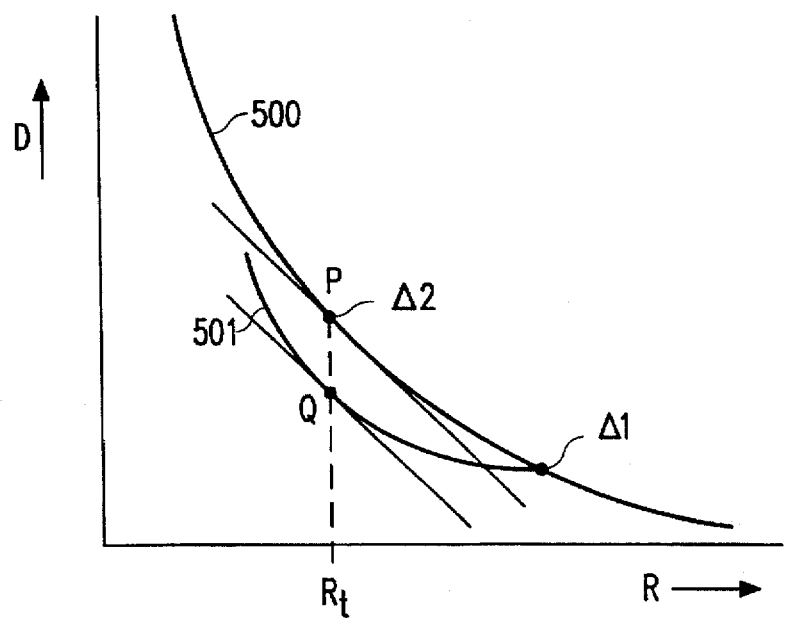
FIG. 5 shows some entropy-distortion diagrams to explain the operation of the λ calculator shown in FIG. 3.

The entropy H and the distortion D are both a function of the current step size α. It is recalled that the RD curve 500 in FIG. 5 is obtained by calculating H and D for various stepsizes. The RD curve 500 appears to correspond to a very satisfactory extent to the actual RD curve after encoding the relevant picture.

In a second embodiment of computing the bit rate R, account is taken of the variable-length tables used by variable-length coding circuit denoted 4 in FIG. 2. DC coefficients (i.e. coefficients $c_i$ for which i=0) are individually coded, using a DC code table. This code tables specifies for each DC amplitude n a codeword-length $l_n$. Recalling that the number of occurrences of DC coefficients $c_0$ with amplitude n is stored in histogram $h_{0,n}$, the number of bits to encode all DC coefficients is:

$$R_{dc} = \sum_n l_n \cdot h_{0,n}$$

AC coefficients (coefficients $c_i$ for which i≠0) are encoded in a different manner. The MPEG standard comprises an AC code table specifying the codeword-lengths of "events", each event having a value (the quantization level $r_k$ of a non-zero coefficient) and a run length of zero coefficients preceding said non-zero coefficient. The number of events and their values can be derived from the histograms $h_{i,n}$. What cannot be derived from the histograms is the run length for each event. Therefore, an average run length for each value $r_k$ is used. The average run length is derived from the AC code table, using the assumption that said table applies to typical pictures. An average codeword length $L_k$ corresponding with said average run length is also derived from the code table. The number of bits to encode the AC coefficients can thus be approximated by multiplying the number of occurrences of events with the value $r_k$, i.e. the number of occurrences of coefficient $c_i$ with an amplitude $t_k < n < t_{k+1}$, which is:

$$\sum_{n=t_k}^{t_{k+1}} h_{i,n}$$

with the average codeword length $L_k$ and adding up all possible values and spatial frequencies. Hence:

$$R_{ac} = \sum_{i=1}^{63} \sum_k L_k \sum_{n=t_k}^{t_{k+1}} h_{i,n}.$$

Finally, an end-of-block code EOB is included in each block. Because the EOB is a fixed-length code, a fixed number of bits $R_{eob}$ is required for transmitting the EOB codes. An adequate approximation of the bit rate bits R is thus:

$$R = R_{dc} + R_{ac} + R_{eob}$$

Having estimated the distortion D and bit rate R for a plurality of step sizes α, computing circuit 603 calculates the Lagrange multiplier λ as the derivative −dD/dR in the point P of operation. If $(R_2,D_2)$ is the point of operation P and two points $(R_1,D_1)$ and $(R_3,D_3)$ are in its proximity, λ follows from:

$$-\lambda = \frac{R_1^2(D_2 - D_3) + 2R_1R_2(D_2 - D_1) + R_2^2(D_1 - D_2) + 2R_2R_3(D_1 - D_2) + R_3^2(D_1 - D_2)}{(R_1 - R_2)(R_3 - R_1)(R_3 - R_2)}$$

An alternative is the less complex and also less accurate two-point approach of λ from two points $(R_1,D_1)$ and $(R_3,D_3)$ proximate to the point of operation:

$$-\lambda = \frac{D_1 - D_3}{R_1 - R_3}$$

The value of λ thus found is applied to quantizer 3 (see FIG. 2). When a picture is being coded, λ has the same value for all picture blocks of the picture. FIG. 5 illustrates how the encoder reacts to the applied λ. In this Figure, the reference numeral 500 denotes the RD curve as computed by RD estimation circuit 602. For λ=0 (i.e. no modification of the coefficients), the encoder would operate at the point P because the bitrate control circuit 5 (see FIG. 2) generates a step size (α2) which actually leads to the target number of bits. However, as will be described, the coefficients are imaged at different quantization levels under the influence of λ. This causes the number of bits to be reduced. The bitrate control circuit reacts thereto by reducing the step size. More particularly, the bitrate control circuit automatically controls the step size to that value (α1) at which the derivative of rate distortion curve 501 at point Q remains equal to the derivative of the RD curve at point P.

In the above described embodiment of the λ-calculator, the RD curve for the image has been estimated using the same step size α for all blocks constituting said image. It has been found that the estimated RD curve corresponds to a satisfactory extent to the actual RD curve for the current image. Nevertheless, a yet more accurate RD curve can be estimated if it is realised that the actual MPEG encoder adaptively varies the quantization step size from (macro-) block to (macro-)block. Generally, the step size depends on the activity of said block. Blocks having a low activity are quantized with a smaller step size than blocks having a high activity, because high activity (e.g. much image detail) masks the effect of courser quantization. In accordance with ISO-IEC/JTC1/SC29/WG11/N0400 (better known as MPEG2 Test Model 5), April 1993, page 57, an adequate step size $\alpha_m$ for the m-th (macro-)block is:

$$\alpha_m = \alpha \cdot f(A_m)$$

in which $\alpha$ is a reference step size, $A_m$ is the activity of the m-th block, and $f(A_m)$ is an appropriate function defining how $\alpha_m$ depends on said activity.

Figure 6:
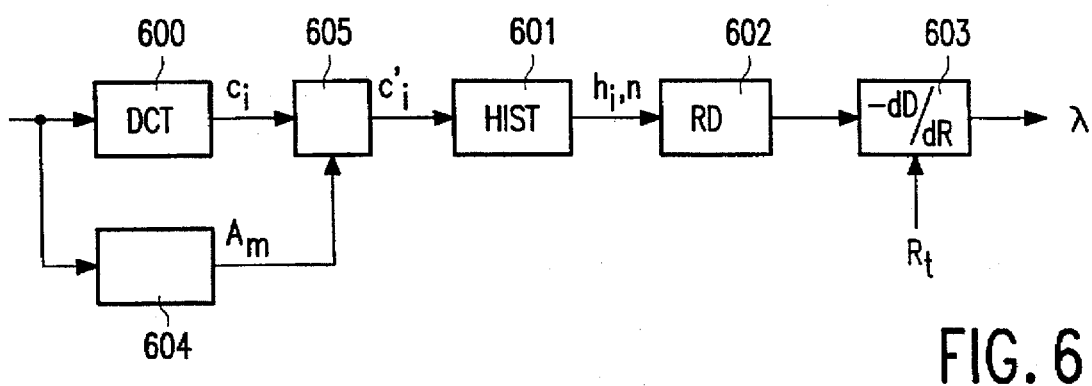
FIGS. 6 and 7 show block diagrams of further embodiments of the λ calculator.

FIG. 6 shows an embodiment of $\lambda$-calculator 6, which takes block activity into account for the purpose of estimating the RD curve. The $\lambda$-calculator comprises an activity determining circuit 604 which calculates the activity $A_m$ of each block m from its pixel values, for example in accordance with page 57 of MPEG2 Test Model 5. A correction circuit 605 modifies each DCT coefficient $c_i$ into an activity-corrected coefficient $c'_i$ in accordance with the expression:

$$c'_i = \frac{c_i}{f(A_m)}$$

The circuit elements 600–603 are the same as in FIG. 3. As before, the histogram forming circuit 601 counts the number of occurrences of coefficients having the same amplitude. However, the coefficients originally having an amplitude n now have an amplitude $n/f(A_m)$. The RD estimating circuit 602 calculates a plurality of (R,D) points for different step sizes. Applying step size $\alpha$ to amplitude $n/f(A_m)$ has the same effect as applying the step size $\alpha_m = \alpha \cdot f(A_m)$ to amplitude n. Adaptive quantization is thus incorporated in the calculation of $\lambda$.

A more accurate RD curve can also be estimated if it is realised that the actual MPEG encoder may encode selected (macro-)blocks of inter coded (P,B) pictures in the intra coding mode. This implies that an inter quantization matrix with weighting factors $W_{e,i}$ is used to quantize the majority of blocks of the inter coded picture, whereas a different intra quantization matrix with weighting factors $W_{a,i}$ is used to quantize intra blocks.

Figure 7:
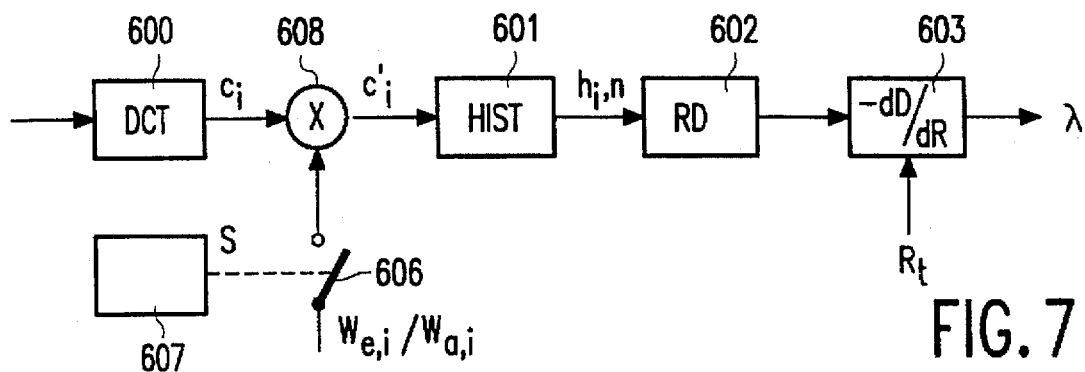

FIG. 7 shows a yet further embodiment of $\lambda$-calculator 6 which takes the intra coding mode of blocks of P- or B-pictures into account for the purpose of estimating the RD curve. The $\lambda$-calculator comprises a switch 606 which is activated by a switching signal S when a block to be intra coded is received. The signal S is generated by a pre-analysis circuit 607 which determines whether inter of intra coding of a block is more efficient. In response to the signal S, a multiplier 608 modifies each DCT coefficient $c_i$ of intra blocks into a coding-mode-corrected coefficient $c'_i$ in accordance with the expression:

$$c'_i = c_i \times \frac{W_{e,i}}{W_{a,i}}$$

The circuit elements 600–603 are the same as in FIG. 3. As before, the histogram forming circuit 601 counts the coefficients having the same amplitude. However, the coefficients of intra coded blocks originally having an amplitude n now have an amplitude $n*(W_{e,i}/W_{a,i})$. The RD estimating circuit 602 calculates a plurality of (R,D) points for different step-sizes. Applying step size $\alpha$ to amplitude $n*(W_{e,i}/W_{a,i})$ has the same effect as applying the step size $\alpha_i = \alpha*(W_{a,i}/W_{e,i})$ to amplitude n. The effect of applying the overall weighting factor $W_{e,i}$ to all blocks of the P- or B-picture is thus cancelled for intra blocks and replaced by applying the intra weighting factor $W_{a,i}$.

Figure 8:
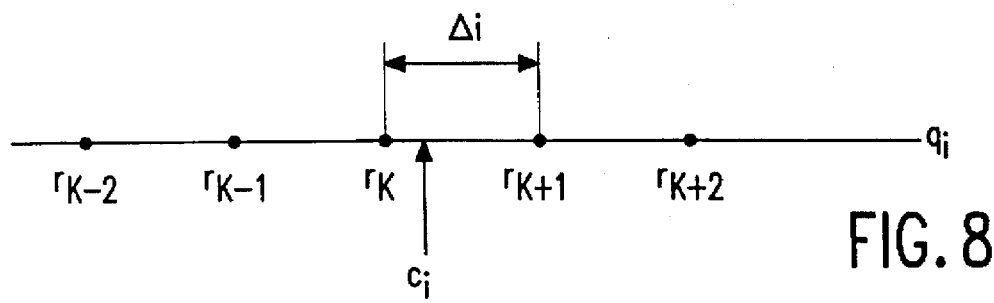
FIG. 8 shows a quantization diagram to explain the operation of a quantizer shown in FIG. 2.
Figure 9:
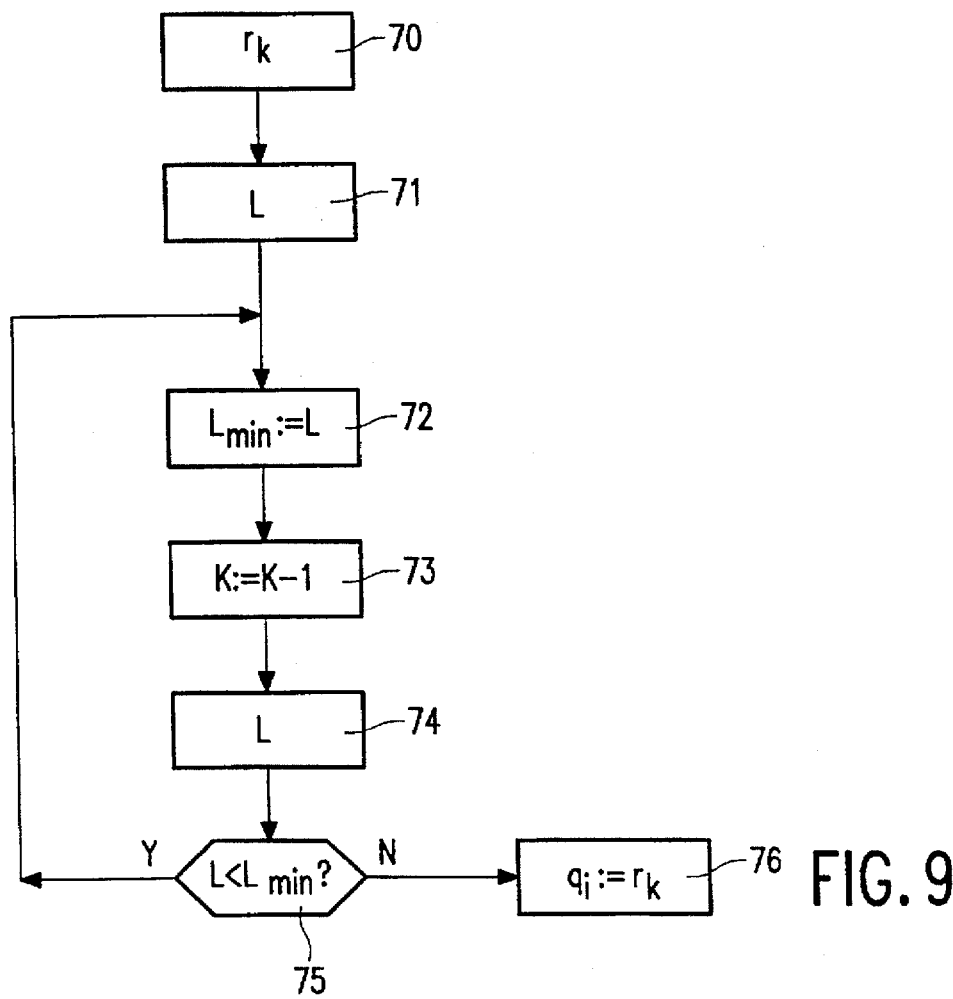
FIGS. 9 and 10 show flow charts to explain the operation of the quantizer shown in FIG. 2.

The operation of quantizer 3 will now be explained with reference to FIGS. 8 and 9. FIG. 8 shows a scale of possible values of DCT coefficients $c_i$. The references $r_{k-1}, r_k, r_{k+1}, \ldots$ denote the discrete quantization levels which the quantized coefficient $q_i$ may assume. Said quantization levels are spaced apart by a step size $\alpha_i$ as described before in response to the step size $\alpha$ which is applied by bitrate control circuit 5 (see FIG. 2). FIG. 9 shows a flow chart of operations performed by the quantizer on coefficient $c_i$. In an initial step 70, the value of $c_i$ is imaged at the most proximate quantization level $r_k$. In a step 71, the "Lagrangian cost" L is subsequently computed for this quantization level $r_k$ in accordance with the formula:

$$L = (c_i - r_k)^2 + \lambda \cdot R_k$$

In this formula, $(c_i - r_k)^2$ is a measure of the distortion which is a result of the approximation of $c_i$ by $r_k$, and $R_k$ is the number of bits required for transmitting $c_i$. In a step 72, the computed Lagrangian cost L is saved as $L_{min}$.

Subsequently, the coefficient $c_i$ imaged at a lower quantization level $r_{k-1}$. This is shown in the Figure by decreasing the index k by 1 in a step 73. In a step 74 the Lagrangian cost L is computed for this new quantization level. In a step 75 it is checked whether this Lagrangian cost L is smaller than $L_{min}$. If this is the case, then the lower quantization level $r_{k-1}$ is apparently more favourable in terms of rate-distortion than $r_k$. In other words, the distortion increases but the gain in the number of bits is more important. The quantizer then performs the steps 72–75 again so as to check whether an even lower quantization level is still more favourable. The search for the minimum Lagrangian cost in this way is discontinued as soon as it has been found in step 75 that L increases again. The quantization level corresponding to $L_{min}$ is subsequently selected in a step 76 for quantization of the coefficient $c_i$. The algorithm shown in FIG. 9 is performed for all coefficients $c_i$ of a picture block.

It is to be noted that the level 0 may be reached when a lower quantization level is chosen (step 73). However, zero coefficients are not coded themselves but are included in the code for the next non-zero coefficient. The consequences thereof for the number of bits are included in the term $R_k$ of the formula for L (step 74).

Practical experiments have proved that the quantization level found is hardly ever more than one or two steps below the "conventional" level. Therefore it is also possible and simpler to compute the Lagrangian cost L only for some quantization levels (the "conventional" level $r_k$ and two levels below this level), and to simply select the level which yields the smallest L.

The quantization process described above is referred to as bitrate-constrained quantization of DCT coefficients. It provides a significant improvement of the picture quality in comparison with conventional MPEG coding in which the most proximate quantization level is coded and transmitted for each coefficient.

Figure 10:
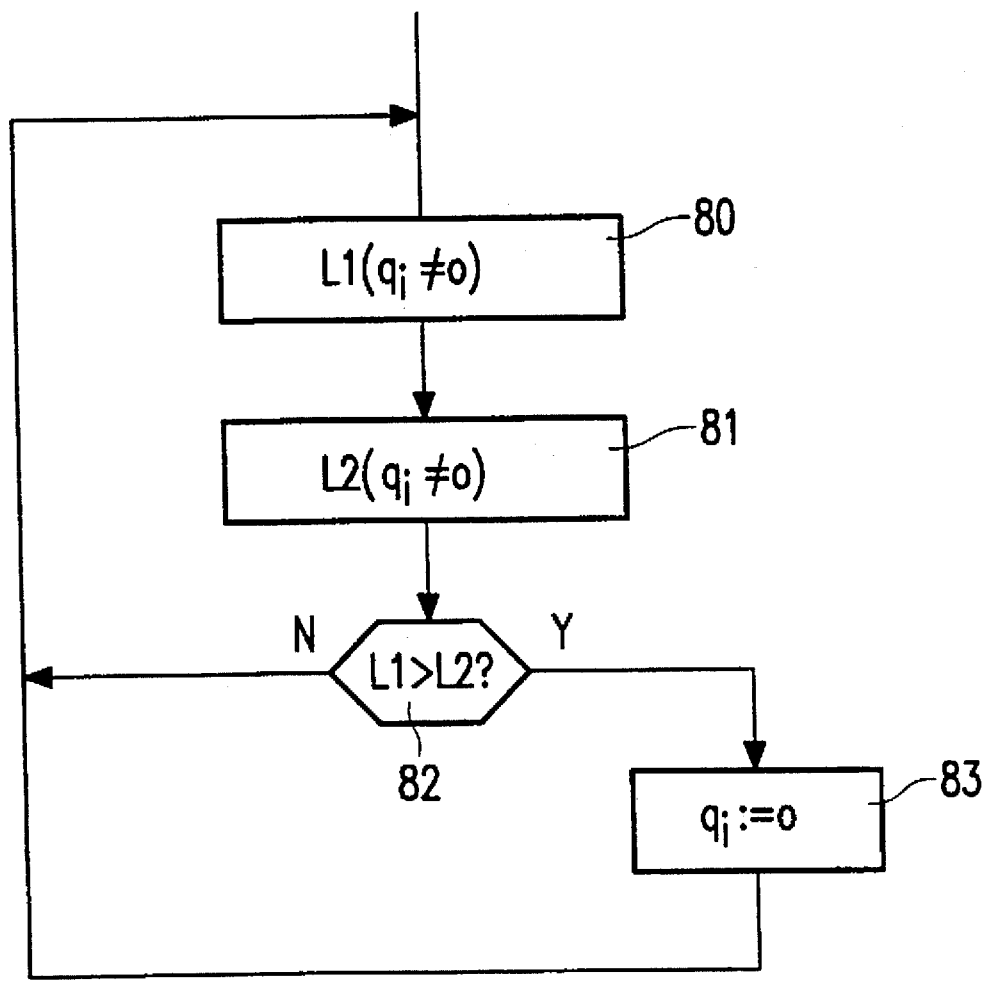

A further improvement of the picture quality is obtained by subsequently subjecting the coefficients $q_i$ thus obtained to thresholding. As already previously noted, thresholding is understood to mean that selected coefficients are rendered zero. FIG. 10 shows a flow chart of the operations which are performed for this purpose on each non-zero coefficient $q_i$. In a step 80, the Lagrangian cost L1 is computed for this coefficient $q_i \neq 0$ given the current value of $\lambda$. It holds for L1 that:

$$L1=(c_i-q_i)^2+\lambda \cdot R_i$$

in which $R_i$ is the number of bits for transmission of $q_i$ and the possibly preceding zero-coefficients. In a step 81, the Lagrangian cost L2 is computed for the case where the value of zero would be enforced on $q_i$. It holds for L2 that:

$$L2=(c_i-0)^2+\lambda \cdot \alpha R_i$$

in which $\alpha R_i$ is the number of bits which is saved by rendering $q_i$ zero (the coding of $q_i=0$ is included in the coding of the next non-zero coefficient). Subsequently it is checked in a step 82 whether L1>L2. If this is not the case, $q_i$ will remain unchanged. If this is the case, $q_i$ will receive the value of zero in a step 83. The procedure is then repeated for a subsequent non-zero coefficient.

The thresholding algorithm shown in FIG. 10 determines once per coefficient whether it is more favourable to maintain this coefficient or render it zero. This is considerably simpler and less intensive in computation than the algorithm which is described in the afore-mentioned article "Rate-Distortion Optimal Fast Thresholding with complete JPEG/MPEG Decoder Compatibility" which computes all possible thresholding options and selects the most favourable of them. Nevertheless, the form of thresholding described yields a considerable improvement of the picture quality. It has particularly been found that the combination of bitrate-constrained quantization and thresholding significantly improves the picture quality.

An even further improvement is obtained by comparing the Lagrangian cost of a picture block with that of a picture block all coefficients of which have the value of 0. In fact, blocks all coefficients of which have the value of 0 need not be transmitted. It suffices to indicate such empty blocks in a parameter, in MPEG referred to as coded_block_pattern. Obviously, the number of bits involved in encoding coded_block_pattern is taken into account in the $\lambda R$ term of the Lagrangian cost $L=D+\lambda R$.

It should be noted that other coding parameters than the quantization level can be controlled. The calculated value of $\lambda$ can also be used, inter alia, to select optimal motion vectors, to select between field or frame coding mode, to select one from a plurality of prediction modes (forward, backward), etc.

In summary, the picture quality of an MPEG-coded video signal can be improved considerably by modifying selected coefficients after conventional quantization, for example by rendering them zero. The modification is such that the Lagrangian cost $D+\lambda R$ (D is distortion, R is bitrate) is minimal for a given value of a Lagrange multiplier $\lambda$. A relatively simple process is disclosed in which the value of $\lambda$ is calculated by means of statistical analysis (6) of the picture to be coded. The statistical analysis comprises the estimation of the RD curve on the basis of the amplitude distribution of the coefficients. The searched $\lambda$ is the derivative of this curve at the desired bitrate.

We claim:

1. A device for coding video pictures, comprising:
    a picture transformer (2) for transforming blocks of pixels into coefficients;
    coding means (3,4) for encoding said coefficients, the bit rate R and distortion D of the encoded picture being determined by a coding parameter ($r_k$);
    means (3) for selecting one from a series of coding parameter values for which the sum $D+\lambda R$ is minimal for an applied value of $\lambda$ wherein $\lambda$ is a Lagrangian multiplier; and
    calculation means (6) for calculating the value of $\lambda$; characterized in that the calculation means (6) comprise:
        means (601) for measuring the amplitude distribution of coefficients;
        means (602) for estimating the bit rate R and distortion D from said amplitude distribution for a plurality of coding parameter values to obtain an estimated RD curve; and
        means (603) for computing $\lambda=-dD/dR$ at a selected point of said RD curve.

2. A device as claimed in claim 1, further comprising means (603) for determining an amount of activity of each pixel block, and means (604) for modifying the coefficient amplitude in accordance with said activity prior to measuring the amplitude distribution.

3. A device as claimed in claim 1, further comprising means (606) for modifying the coefficient amplitude in accordance with a coding mode of the block prior to measuring the amplitude distribution.

4. A device as claimed in claim 1, wherein the amplitude distribution is obtained by counting, for each spatial frequency (i), the number of times ($h_{i,n}$) when a coefficient indicative of said spatial frequency assumes the same amplitude (n).

5. A device as claimed in claim 1, wherein the means (602) for estimating the bit rate R is adapted to calculate the entropy (H) from said amplitude distribution, said entropy being indicative for the bit rate R.

6. A device as claimed in claim 1, wherein the means (602) for estimating the bit rate R is adapted to cumulatively add, for all spatial frequencies, the product of the number of bits to encode a given amplitude with the number of occurrences when a coefficient assumes said amplitude as defined by the amplitude distribution.

7. A device as claimed in claim 6, wherein coefficients are variable-length encoded and the number of bits to encode a given amplitude is a predetermined average word length.

8. A method of coding video pictures, comprising the steps of:
    transforming blocks of pixels into coefficients;
    quantizing the coefficients and modifying the quantized coefficients in order that the sum $D+\lambda R$, in which D is the distortion and R is the bitrate, is reduced for an applied value of $\lambda$ wherein $\lambda$ is a Lagrangian multiplier; and
    coding the modified coefficients; characterized in that the method comprises the step of calculating the value of $\lambda$ by:
    measuring the amplitude distribution of coefficients;
    estimating the bit rate R and distortion D from said amplitude distribution for a plurality of step sizes to obtain an estimated RD curve; and
    computing $\lambda=-dD/dR$ at a selected point of said RD curve.

9. A method as claimed in claim 7, further comprising the step of determining an amount of activity of each pixel block, and modifying the coefficient amplitude in accordance with said activity prior to measuring the amplitude distribution.

10. A method as claimed in claim 8, further comprising the step of modifying the coefficient amplitude in accordance with an inter or intra coding mode of the block prior to measuring the amplitude distribution.

11. A method as claimed in claim 8, wherein the amplitude distribution is obtained by counting, for each spatial frequency (i), the number of times ($h_{i,n}$) when a coefficient indicative of said spatial frequency assumes the same amplitude (n).

12. A method as claimed in claim 8, wherein the step of estimating the bit rate R is adapted to calculate the entropy (H) from said amplitude distribution, said entropy being indicative for the bit rate R.

13. A method as claimed in claim 8, wherein the step of estimating the bit rate R is adapted to cumulatively add, for all spatial frequencies, the product of the number of bits to encode a given amplitude with the number of occurrences when a coefficient assumes said amplitude as defined by the amplitude distribution.

14. A method as claimed in claim 13, wherein coefficients are variable-length encoded and the number of bits to encode a given amplitude is a predetermined average word length.

15. A method of coding video pictures, comprising the steps of:

transforming blocks of pixels into coefficients;

encoding said coefficients, the bit rate R and distortion D of the encoded picture being determined by a coding parameter;

selecting one from a series of coding parameter values for which the sum $D+\lambda R$ is minimal for an applied value of $\lambda$ wherein $\lambda$ is a Lagrangian multiplier; and calculating the value of $\lambda$; characterized in that the step of calculating comprises:

measuring the amplitude distribution of coefficients;

estimating the bit rate R and distortion D from said amplitude distribution for a plurality of coding parameter values to obtain an estimated RD curve; and computing $\lambda=-dD/dR$ at a selected point of said RD curve.

16. A method as claimed in claim 15, further comprising the step of modifying the coefficient amplitude in accordance with an inter or intra coding mode of the block prior to measuring the amplitude distribution.

17. A method as claimed in claim 15, wherein the amplitude distribution is obtained by counting, for each spatial frequency (i), the number of times ($h_{i,n}$) when a coefficient indicative of said spatial frequency assumes the same amplitude (n).

18. A method as claimed in claim 15, wherein the step of estimating the bit rate R is adapted to calculate the entropy (H) from said amplitude distribution, said entropy being indicative for the bit rate R.

19. A method as claimed in claim 15, wherein the step of estimating the bit rate R is adapted to cumulatively add, for all spatial frequencies, the product of the number of bits to encode a given amplitude with the number of occurrences when a coefficient assumes said amplitude as defined by the amplitude distribution.

20. A method as claimed in claim 19, wherein coefficients are variable-length encoded and the number of bits to encode a given amplitude is a predetermined average word length.

* * * * *